(12) United States Patent
Liu et al.

(10) Patent No.: US 8,323,607 B2
(45) Date of Patent: Dec. 4, 2012

(54) CARBON NANOTUBE STRUCTURE

(75) Inventors: Kai Liu, Beijing (CN); Kai-Li Jiang, Beijing (CN); Ying-Hui Sun, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 59 days.

(21) Appl. No.: 12/960,666

(22) Filed: Dec. 6, 2010

(65) Prior Publication Data

US 2011/0318255 A1 Dec. 29, 2011

(30) Foreign Application Priority Data

Jun. 29, 2010 (CN) .......................... 2010 1 0212030

(51) Int. Cl.
*D01F 9/12* (2006.01)
*D01F 9/127* (2006.01)
(52) U.S. Cl. ............... 423/447.2; 423/447.1; 423/447.3; 977/742; 977/752; 977/843
(58) Field of Classification Search ....... 423/447.1–447, 423/445 B; 977/742–754, 842–848; 428/367
See application file for complete search history.

(56) References Cited

U.S. PATENT DOCUMENTS

| 2006/0655074 | 3/2005 | Huang et al. |
|---|---|---|
| 2005/0167647 A1 | 8/2005 | Huang et al. |
| 2005/0236951 A1 | 10/2005 | Liu et al. |
| 2005/0264155 A1 | 12/2005 | Liu et al. |
| 2005/0266766 A1 | 12/2005 | Wei et al. |
| 2006/0017370 A1 | 1/2006 | Liu et al. |
| 2006/0022576 A1 | 2/2006 | Liu et al. |
| 2006/0035084 A1 | 2/2006 | Liu et al. |
| 2006/0073332 A1 | 4/2006 | Huang et al. |
| 2006/0135677 A1 | 6/2006 | Huang et al. |
| 2006/0219689 A1 | 10/2006 | Huang et al. |
| 2006/0234056 A1 | 10/2006 | Huang et al. |
| 2006/0239898 A1 | 10/2006 | Fan et al. |
| 2006/0257566 A1 | 11/2006 | Liu et al. |
| 2007/0013287 A1 | 1/2007 | Huang et al. |
| 2007/0031299 A1 | 2/2007 | Fan et al. |
| 2007/0031320 A1 | 2/2007 | Fan et al. |
| 2007/0048211 A1 | 3/2007 | Fan et al. |
| 2007/0059864 A1 | 3/2007 | Huang et al. |
| 2007/0065002 A1 | 3/2007 | Liu et al. |

(Continued)

FOREIGN PATENT DOCUMENTS

CN 1432528 7/2003

(Continued)

OTHER PUBLICATIONS

Jiang et al. "Spinning Continuous Carbon Nanotube Yarns", Nature, 419, 801 (Oct. 24, 2002).

*Primary Examiner* — Daniel C McCracken
(74) *Attorney, Agent, or Firm* — Altis Law Group, Inc.

(57) ABSTRACT

A carbon nanotube structure includes a number of carbon wires and a number of second carbon nanotubes. Each of the carbon nanotube wires includes a number of first carbon nanotubes joined end to end by the carbon-carbon bonds therebetween. The carbon wires and the carbon nanotubes are joined by van der Waals attractive force therebetween.

17 Claims, 9 Drawing Sheets

U.S. PATENT DOCUMENTS

| | | |
|---|---|---|
| 2007/0071895 A1 | 3/2007 | Liu et al. |
| 2007/0075619 A1 | 4/2007 | Liu et al. |
| 2007/0103048 A1 | 5/2007 | Liu et al. |
| 2007/0115413 A1 | 5/2007 | Jiang et al. |
| 2007/0144780 A1 | 6/2007 | Liu et al. |
| 2007/0145878 A1 | 6/2007 | Liu et al. |
| 2007/0166223 A1 | 7/2007 | Fan et al. |
| 2007/0222356 A1 | 9/2007 | Liu et al. |
| 2007/0231493 A1 | 10/2007 | Liu et al. |
| 2007/0236126 A1 | 10/2007 | Fan et al. |
| 2007/0237952 A1 | 10/2007 | Fan et al. |
| 2007/0244245 A1 | 10/2007 | Yao et al. |
| 2007/0284987 A1 | 12/2007 | Liu et al. |
| 2007/0292614 A1 | 12/2007 | Liu et al. |
| 2007/0293086 A1 | 12/2007 | Liu et al. |
| 2007/0296321 A1 | 12/2007 | Liu et al. |
| 2007/0296323 A1 | 12/2007 | Liu et al. |
| 2007/0296897 A1 | 12/2007 | Liu et al. |
| 2008/0001513 A1 | 1/2008 | Liu et al. |
| 2008/0007154 A1 | 1/2008 | Wei et al. |
| 2008/0012465 A1 | 1/2008 | Liu et al. |
| 2008/0012587 A1 | 1/2008 | Fan et al. |
| 2008/0026168 A1 | 1/2008 | Liu et al. |
| 2008/0030117 A1 | 2/2008 | Liu et al. |
| 2008/0030123 A1 | 2/2008 | Liu et al. |
| 2008/0039557 A1 | 2/2008 | Liu et al. |
| 2008/0063860 A1 | 3/2008 | Liu et al. |
| 2008/0087646 A1 | 4/2008 | Liu et al. |
| 2008/0118634 A1 | 5/2008 | Liu et al. |
| 2008/0122335 A1 | 5/2008 | Liu et al. |
| 2008/0145570 A1 | 6/2008 | Liu et al. |
| 2008/0157649 A1 | 7/2008 | Liu et al. |
| 2008/0160795 A1 | 7/2008 | Liu et al. |
| 2008/0160865 A1 | 7/2008 | Liu et al. |
| 2008/0160866 A1 | 7/2008 | Liu et al. |
| 2008/0170982 A1* | 7/2008 | Zhang et al. ............... 423/447.3 |
| 2008/0173098 A1 | 7/2008 | Jiang et al. |
| 2008/0203884 A1 | 8/2008 | Fan et al. |
| 2008/0214082 A1 | 9/2008 | Wei et al. |
| 2008/0220242 A1 | 9/2008 | Liu et al. |
| 2008/0227360 A1 | 9/2008 | Liu et al. |
| 2008/0237464 A1 | 10/2008 | Liu et al. |
| 2008/0239489 A1 | 10/2008 | Liu et al. |
| 2008/0241695 A1 | 10/2008 | Liu et al. |
| 2008/0245548 A1 | 10/2008 | Liu et al. |
| 2008/0248235 A1 | 10/2008 | Liu et al. |
| 2008/0251270 A1 | 10/2008 | Liu et al. |
| 2008/0251274 A1 | 10/2008 | Liu et al. |
| 2008/0252195 A1 | 10/2008 | Liu et al. |
| 2008/0254675 A1 | 10/2008 | Liu et al. |
| 2008/0299031 A1 | 12/2008 | Liu et al. |
| 2008/0299308 A1 | 12/2008 | Liu et al. |
| 2008/0299480 A1 | 12/2008 | Liu et al. |
| 2008/0308295 A1 | 12/2008 | Liu et al. |
| 2009/0001867 A1 | 1/2009 | Liu et al. |
| 2009/0013792 A1 | 1/2009 | Liu et al. |
| 2009/0014864 A1 | 1/2009 | Jiang et al. |
| 2009/0028779 A1 | 1/2009 | Liu et al. |
| 2009/0032496 A1 | 2/2009 | Liu et al. |
| 2009/0061208 A1 | 3/2009 | Liu et al. |
| 2009/0068448 A1 | 3/2009 | Liu et al. |
| 2009/0072706 A1 | 3/2009 | Liu et al. |
| 2009/0073363 A1 | 3/2009 | Liu et al. |
| 2009/0075171 A1 | 3/2009 | Jiang et al. |
| 2009/0079320 A1 | 3/2009 | Liu et al. |
| 2009/0081408 A1 | 3/2009 | Jiang et al. |
| 2009/0085461 A1 | 4/2009 | Jiang et al. |
| 2009/0092813 A1 | 4/2009 | Jiang et al. |
| 2009/0096346 A1 | 4/2009 | Fan et al. |
| 2009/0096348 A1 | 4/2009 | Fan et al. |
| 2009/0098453 A1 | 4/2009 | Fan et al. |
| 2009/0098463 A1 | 4/2009 | Fan et al. |
| 2009/0101488 A1 | 4/2009 | Fan et al. |
| 2009/0102810 A1 | 4/2009 | Fan et al. |
| 2009/0104832 A1 | 4/2009 | Liu et al. |
| 2009/0117434 A1 | 5/2009 | Fan et al. |
| 2009/0117437 A1 | 5/2009 | Fan et al. |
| 2009/0142576 A1 | 6/2009 | Liu et al. |
| 2009/0146547 A1 | 6/2009 | Liu et al. |
| 2009/0153012 A1 | 6/2009 | Liu et al. |
| 2009/0153502 A1 | 6/2009 | Liu et al. |
| 2009/0153503 A1 | 6/2009 | Liu et al. |
| 2009/0153504 A1 | 6/2009 | Liu et al. |
| 2009/0153505 A1 | 6/2009 | Liu et al. |
| 2009/0153506 A1 | 6/2009 | Liu et al. |
| 2009/0153507 A1 | 6/2009 | Liu et al. |
| 2009/0153508 A1 | 6/2009 | Liu et al. |
| 2009/0153509 A1 | 6/2009 | Liu et al. |
| 2009/0153510 A1 | 6/2009 | Liu et al. |
| 2009/0153511 A1 | 6/2009 | Liu et al. |
| 2009/0153512 A1 | 6/2009 | Liu et al. |
| 2009/0153513 A1 | 6/2009 | Liu et al. |
| 2009/0153514 A1 | 6/2009 | Liu et al. |
| 2009/0153515 A1 | 6/2009 | Liu et al. |
| 2009/0153516 A1 | 6/2009 | Liu et al. |
| 2009/0153520 A1 | 6/2009 | Liu et al. |
| 2009/0153521 A1 | 6/2009 | Liu et al. |
| 2009/0155467 A1 | 6/2009 | Fan et al. |
| 2009/0159188 A1 | 6/2009 | Liu et al. |
| 2009/0159198 A1 | 6/2009 | Fan et al. |
| 2009/0159328 A1 | 6/2009 | Liu et al. |
| 2009/0160306 A1 | 6/2009 | Jiang et al. |
| 2009/0160312 A1 | 6/2009 | Liu et al. |
| 2009/0160796 A1 | 6/2009 | Liu et al. |
| 2009/0160797 A1 | 6/2009 | Liu et al. |
| 2009/0160798 A1 | 6/2009 | Liu et al. |
| 2009/0160799 A1 | 6/2009 | Liu et al. |
| 2009/0167136 A1 | 7/2009 | Liu et al. |
| 2009/0167137 A1 | 7/2009 | Liu et al. |
| 2009/0167138 A1 | 7/2009 | Liu et al. |
| 2009/0167707 A1 | 7/2009 | Liu et al. |
| 2009/0167708 A1 | 7/2009 | Liu et al. |
| 2009/0167709 A1 | 7/2009 | Liu et al. |
| 2009/0167710 A1 | 7/2009 | Liu et al. |
| 2009/0167711 A1 | 7/2009 | Liu et al. |
| 2009/0170394 A1 | 7/2009 | Liu et al. |
| 2009/0181239 A1 | 7/2009 | Fan et al. |
| 2009/0181594 A1 | 7/2009 | Liu et al. |
| 2009/0194313 A1 | 8/2009 | Liu et al. |
| 2009/0195138 A1 | 8/2009 | Xiao et al. |
| 2009/0195139 A1 | 8/2009 | Wei et al. |
| 2009/0195140 A1 | 8/2009 | Wei et al. |
| 2009/0195742 A1 | 8/2009 | Liu et al. |
| 2009/0196981 A1 | 8/2009 | Liu et al. |
| 2009/0196982 A1 | 8/2009 | Liu et al. |
| 2009/0196985 A1 | 8/2009 | Liu et al. |
| 2009/0197038 A1 | 8/2009 | Fan et al. |
| 2009/0197082 A1 | 8/2009 | Liu et al. |
| 2009/0215651 A1 | 8/2009 | Fan et al. |
| 2009/0223558 A1 | 9/2009 | Sun et al. |
| 2009/0225264 A1 | 9/2009 | Liu et al. |
| 2009/0225265 A1 | 9/2009 | Fan et al. |
| 2009/0236961 A1 | 9/2009 | Wei et al. |
| 2009/0236965 A1 | 9/2009 | Liu et al. |
| 2009/0239072 A1 | 9/2009 | Wei et al. |
| 2009/0239439 A1 | 9/2009 | Wei et al. |
| 2009/0250107 A1 | 10/2009 | Sun et al. |
| 2009/0250113 A1 | 10/2009 | Sun et al. |
| 2009/0250114 A1 | 10/2009 | Fan et al. |
| 2009/0255529 A1 | 10/2009 | Liu et al. |
| 2009/0255706 A1 | 10/2009 | Liu et al. |
| 2009/0256135 A1 | 10/2009 | Liu et al. |
| 2009/0256462 A1 | 10/2009 | Xiao et al. |
| 2009/0256463 A1 | 10/2009 | Xiao et al. |
| 2009/0258448 A1 | 10/2009 | Liu et al. |
| 2009/0260679 A1 | 10/2009 | Sun et al. |
| 2009/0260688 A1 | 10/2009 | Fan et al. |
| 2009/0266355 A1 | 10/2009 | Liu et al. |
| 2009/0266356 A1 | 10/2009 | Liu et al. |
| 2009/0267000 A1 | 10/2009 | Chen et al. |
| 2009/0268139 A1 | 10/2009 | Liu et al. |
| 2009/0268142 A1 | 10/2009 | Liu et al. |
| 2009/0268149 A1 | 10/2009 | Liu et al. |
| 2009/0268556 A1 | 10/2009 | Xiao et al. |
| 2009/0268557 A1 | 10/2009 | Xiao et al. |
| 2009/0268558 A1 | 10/2009 | Xiao et al. |
| 2009/0268559 A1 | 10/2009 | Xiao et al. |

| | | | | | | |
|---|---|---|---|---|---|---|
| 2009/0268560 A1 | 10/2009 | Xiao et al. | | 2010/0093117 A1 | 4/2010 | Liu et al. |
| 2009/0268561 A1 | 10/2009 | Xiao et al. | | 2010/0093247 A1 | 4/2010 | Liu et al. |
| 2009/0268563 A1 | 10/2009 | Xiao et al. | | 2010/0098272 A1 | 4/2010 | Xiao et al. |
| 2009/0269257 A1 | 10/2009 | Jiang et al. | | 2010/0098273 A1 | 4/2010 | Xiao et al. |
| 2009/0269498 A1 | 10/2009 | Jiang et al. | | 2010/0104735 A1 | 4/2010 | Wei et al. |
| 2009/0269684 A1 | 10/2009 | Liu et al. | | 2010/0104808 A1 | 4/2010 | Liu et al. |
| 2009/0274008 A1 | 11/2009 | Xiao et al. | | 2010/0108664 A1 | 5/2010 | Liu et al. |
| 2009/0274009 A1 | 11/2009 | Xiao et al. | | 2010/0110839 A1 | 5/2010 | Qian et al. |
| 2009/0278436 A1 | 11/2009 | Xiao et al. | | 2010/0122980 A1 | 5/2010 | Liu et al. |
| 2009/0279390 A1 | 11/2009 | Xiao et al. | | 2010/0123267 A1 | 5/2010 | Wei et al. |
| 2009/0283744 A1 | 11/2009 | Fan et al. | | 2010/0124622 A1 | 5/2010 | Fan et al. |
| 2009/0283752 A1 | 11/2009 | Fan et al. | | 2010/0124645 A1 | 5/2010 | Wei et al. |
| 2009/0283753 A1 | 11/2009 | Fan et al. | | 2010/0124646 A1 | 5/2010 | Wei et al. |
| 2009/0283754 A1 | 11/2009 | Fan et al. | | 2010/0126985 A1 | 5/2010 | Liu et al. |
| 2009/0283755 A1 | 11/2009 | Fan et al. | | 2010/0129654 A1 | 5/2010 | Fan et al. |
| 2009/0283771 A1 | 11/2009 | Fan et al. | | 2010/0133569 A1 | 6/2010 | Fan et al. |
| 2009/0286362 A1 | 11/2009 | Fan et al. | | 2010/0139645 A1 | 6/2010 | Liu et al. |
| 2009/0289203 A1 | 11/2009 | Liu et al. | | 2010/0139851 A1 | 6/2010 | Liu et al. |
| 2009/0289555 A1 | 11/2009 | Liu et al. | | 2010/0140258 A1 | 6/2010 | Liu et al. |
| 2009/0291534 A1 | 11/2009 | Fan et al. | | 2010/0140259 A1 | 6/2010 | Liu et al. |
| 2009/0296528 A1 | 12/2009 | Xiao et al. | | 2010/0147827 A1 | 6/2010 | Liu et al. |
| 2009/0297732 A1 | 12/2009 | Liu et al. | | 2010/0147828 A1 | 6/2010 | Liu et al. |
| 2009/0298239 A1 | 12/2009 | Liu et al. | | 2010/0147829 A1 | 6/2010 | Liu et al. |
| 2009/0301993 A1 | 12/2009 | Fan et al. | | 2010/0147830 A1 | 6/2010 | Liu et al. |
| 2009/0302324 A1 | 12/2009 | Fan et al. | | 2010/0151278 A1 | 6/2010 | Liu et al. |
| 2009/0309478 A1 | 12/2009 | Liu et al. | | 2010/0154975 A1 | 6/2010 | Liu et al. |
| 2009/0314765 A1 | 12/2009 | Liu et al. | | 2010/0163547 A1 | 7/2010 | Liu et al. |
| 2009/0317926 A1 | 12/2009 | Liu et al. | | 2010/0166231 A1 | 7/2010 | Liu et al. |
| 2009/0321418 A1 | 12/2009 | Liu et al. | | 2010/0170890 A1 | 7/2010 | Liu et al. |
| 2009/0321419 A1 | 12/2009 | Liu et al. | | 2010/0170891 A1 | 7/2010 | Liu et al. |
| 2009/0321420 A1 | 12/2009 | Liu et al. | | 2010/0172101 A1 | 7/2010 | Fan et al. |
| 2009/0321421 A1 | 12/2009 | Liu et al. | | 2010/0173037 A1 | 7/2010 | Jiang et al. |
| 2009/0321718 A1 | 12/2009 | Liu et al. | | 2010/0180429 A1 | 7/2010 | Jiang et al. |
| 2009/0323475 A1 | 12/2009 | Xiao et al. | | 2010/0181482 A1 | 7/2010 | Jiang et al. |
| 2009/0323476 A1 | 12/2009 | Xiao et al. | | 2010/0187221 A1 | 7/2010 | Liu et al. |
| 2010/0000669 A1 | 1/2010 | Liu et al. | | 2010/0190407 A1 | 7/2010 | Fan et al. |
| 2010/0000985 A1 | 1/2010 | Liu et al. | | 2010/0193350 A1 | 8/2010 | Liu et al. |
| 2010/0000986 A1 | 1/2010 | Liu et al. | | 2010/0200125 A1 | 8/2010 | Jiang et al. |
| 2010/0000987 A1 | 1/2010 | Liu et al. | | 2010/0200567 A1 | 8/2010 | Liu et al. |
| 2010/0000989 A1 | 1/2010 | Liu et al. | | 2010/0200568 A1 | 8/2010 | Liu et al. |
| 2010/0000990 A1 | 1/2010 | Liu et al. | | 2010/0201252 A1 | 8/2010 | Liu et al. |
| 2010/0001971 A1 | 1/2010 | Liu et al. | | 2010/0212711 A1 | 8/2010 | Liu et al. |
| 2010/0001972 A1 | 1/2010 | Liu et al. | | 2010/0213419 A1 | 8/2010 | Fan et al. |
| 2010/0001975 A1 | 1/2010 | Fan et al. | | 2010/0218367 A1 | 9/2010 | Liu et al. |
| 2010/0001976 A1 | 1/2010 | Liu et al. | | 2010/0220379 A1 | 9/2010 | Liu et al. |
| 2010/0006278 A1 | 1/2010 | Liu et al. | | 2010/0221536 A1 | 9/2010 | Yang et al. |
| 2010/0006829 A1 | 1/2010 | Liu et al. | | 2010/0221852 A1 | 9/2010 | Fan et al. |
| 2010/0007263 A1 | 1/2010 | Liu et al. | | 2010/0227058 A1 | 9/2010 | Fan et al. |
| 2010/0007619 A1 | 1/2010 | Liu et al. | | 2010/0230400 A1 | 9/2010 | Liu et al. |
| 2010/0007624 A1 | 1/2010 | Liu et al. | | 2010/0233472 A1 | 9/2010 | Liu et al. |
| 2010/0007625 A1 | 1/2010 | Liu et al. | | 2010/0239849 A1 | 9/2010 | Fan et al. |
| 2010/0019159 A1 | 1/2010 | Xiao et al. | | 2010/0239850 A1 | 9/2010 | Fan et al. |
| 2010/0019171 A1 | 1/2010 | Xiao et al. | | 2010/0243227 A1 | 9/2010 | Huang et al. |
| 2010/0019209 A1 | 1/2010 | Liu et al. | | 2010/0243637 A1 | 9/2010 | Liu et al. |
| 2010/0021774 A1 | 1/2010 | Li et al. | | 2010/0244864 A1 | 9/2010 | Xiao et al. |
| 2010/0021797 A1 | 1/2010 | Fan et al. | | 2010/0245215 A1 | 9/2010 | Liu et al. |
| 2010/0039015 A1 | 2/2010 | Liu et al. | | 2010/0245808 A1 | 9/2010 | Xiao et al. |
| 2010/0041297 A1 | 2/2010 | Liu et al. | | 2010/0247333 A1 | 9/2010 | Qian et al. |
| 2010/0044647 A1 | 2/2010 | Liu et al. | | 2010/0263783 A1 | 10/2010 | Liu et al. |
| 2010/0045913 A1 | 2/2010 | Liu et al. | | 2010/0270704 A1 | 10/2010 | Liu et al. |
| 2010/0046774 A1 | 2/2010 | Fan et al. | | 2010/0270911 A1 | 10/2010 | Jiang et al. |
| 2010/0046784 A1 | 2/2010 | Xiao et al. | | 2010/0272950 A1 | 10/2010 | Liu et al. |
| 2010/0048250 A1 | 2/2010 | Liu et al. | | 2010/0273946 A1 | 10/2010 | Yao et al. |
| 2010/0048254 A1 | 2/2010 | Liu et al. | | 2010/0282403 A1 | 11/2010 | Liu et al. |
| 2010/0051471 A1 | 3/2010 | Liu et al. | | 2010/0283375 A1 | 11/2010 | Yang et al. |
| 2010/0054503 A1 | 3/2010 | Xiao et al. | | 2010/0284002 A1 | 11/2010 | Liu et al. |
| 2010/0054504 A1 | 3/2010 | Xiao et al. | | 2010/0284122 A1 | 11/2010 | Yang et al. |
| 2010/0055024 A1 | 3/2010 | Liu et al. | | 2010/0285300 A1 | 11/2010 | Fan et al. |
| 2010/0056012 A1 | 3/2010 | Liu et al. | | 2010/0296088 A1 | 11/2010 | Xiao et al. |
| 2010/0064957 A1 | 3/2010 | Wei et al. | | 2010/0296677 A1 | 11/2010 | Qian et al. |
| 2010/0065042 A1 | 3/2010 | Liu et al. | | 2010/0301260 A1 | 12/2010 | Yao et al. |
| 2010/0065043 A1 | 3/2010 | Liu et al. | | 2010/0301518 A1 | 12/2010 | Fan et al. |
| 2010/0065190 A1 | 3/2010 | Jiang et al. | | 2010/0305504 A1 | 12/2010 | Liu et al. |
| 2010/0065981 A1 | 3/2010 | Yao et al. | | 2010/0308489 A1 | 12/2010 | Jiang et al. |
| 2010/0073322 A1 | 3/2010 | Fan et al. | | 2010/0310809 A1 | 12/2010 | Jiang et al. |
| 2010/0075469 A1 | 3/2010 | Fan et al. | | 2010/0311002 A1 | 12/2010 | Liu et al. |
| 2010/0085729 A1 | 4/2010 | Xiao et al. | | 2010/0317409 A1 | 12/2010 | Liu et al. |
| 2010/0086150 A1 | 4/2010 | Xiao et al. | | 2010/0319745 A1 | 12/2010 | Fan et al. |
| 2010/0086186 A1 | 4/2010 | Xiao et al. | | 2010/0319750 A1 | 12/2010 | Liu et al. |

| | | |
|---|---|---|
| 2010/0319833 A1 | 12/2010 | Liu et al. |
| 2010/0323246 A1 | 12/2010 | Jiang et al. |
| 2010/0329501 A1 | 12/2010 | Liu et al. |
| 2010/0329502 A1 | 12/2010 | Liu et al. |
| 2011/0001933 A1 | 1/2011 | Qian et al. |
| 2011/0012476 A1 | 1/2011 | Liu et al. |
| 2011/0017921 A1 | 1/2011 | Fan et al. |
| 2011/0019273 A1 | 1/2011 | Fan et al. |
| 2011/0020210 A1 | 1/2011 | Liu et al. |
| 2011/0020563 A1 | 1/2011 | Fan et al. |
| 2011/0024410 A1 | 2/2011 | Liu et al. |
| 2011/0026750 A1 | 2/2011 | Liu et al. |
| 2011/0026758 A1 | 2/2011 | Liu et al. |
| 2011/0027486 A1 | 2/2011 | Fan et al. |
| 2011/0032196 A1 | 2/2011 | Liu et al. |
| 2011/0033076 A1 | 2/2011 | Liu et al. |
| 2011/0033078 A1 | 2/2011 | Liu et al. |
| 2011/0036826 A1 | 2/2011 | Liu et al. |
| 2011/0036828 A1 | 2/2011 | Liu et al. |
| 2011/0037124 A1 | 2/2011 | Liu et al. |
| 2011/0038504 A1 | 2/2011 | Liu et al. |
| 2011/0038505 A1 | 2/2011 | Liu et al. |
| 2011/0039075 A1 | 2/2011 | Chen et al. |
| 2011/0051961 A1 | 3/2011 | Qian et al. |
| 2011/0051973 A1 | 3/2011 | Liu et al. |
| 2011/0051974 A1 | 3/2011 | Liu et al. |
| 2011/0051984 A1 | 3/2011 | Liu et al. |
| 2011/0052477 A1 | 3/2011 | Yao et al. |
| 2011/0052479 A1 | 3/2011 | Jiang et al. |
| 2011/0056433 A1 | 3/2011 | Yang et al. |
| 2011/0056928 A1 | 3/2011 | Liu et al. |
| 2011/0056929 A1 | 3/2011 | Liu et al. |
| 2011/0062350 A1 | 3/2011 | Liu et al. |
| 2011/0062856 A1 | 3/2011 | Fan et al. |
| 2011/0063612 A1 | 3/2011 | Jiang et al. |
| 2011/0063613 A1 | 3/2011 | Jiang et al. |
| 2011/0063951 A1 | 3/2011 | Qian et al. |
| 2011/0064256 A1 | 3/2011 | Liu et al. |
| 2011/0064257 A1 | 3/2011 | Liu et al. |
| 2011/0064259 A1 | 3/2011 | Liu et al. |
| 2011/0069860 A1 | 3/2011 | Liu et al. |
| 2011/0070637 A1 | 3/2011 | Liu et al. |
| 2011/0071681 A1 | 3/2011 | Liu et al. |
| 2011/0075878 A1 | 3/2011 | Liu et al. |
| 2011/0075881 A1 | 3/2011 | Liu et al. |
| 2011/0088829 A1 | 4/2011 | Liu et al. |
| 2011/0094217 A1 | 4/2011 | Liu et al. |
| 2011/0094671 A1 | 4/2011 | Fan et al. |
| 2011/0095237 A1 | 4/2011 | Jiang et al. |
| 2011/0096455 A1 | 4/2011 | Liu et al. |
| 2011/0096952 A1 | 4/2011 | Liu et al. |
| 2011/0096953 A1 | 4/2011 | Liu et al. |
| 2011/0097512 A1 | 4/2011 | Liu et al. |
| 2011/0101845 A1 | 5/2011 | Li et al. |
| 2011/0101846 A1 | 5/2011 | Liu et al. |
| 2011/0108545 A1 | 5/2011 | Fan et al. |
| 2011/0109006 A1 | 5/2011 | Jiang et al. |
| 2011/0110535 A1 | 5/2011 | Qian et al. |
| 2011/0116677 A1 | 5/2011 | Liu et al. |
| 2011/0120633 A1 | 5/2011 | Liu et al. |
| 2011/0137577 A1 | 6/2011 | Liu et al. |
| 2011/0149371 A1 | 6/2011 | Liu et al. |
| 2011/0149372 A1 | 6/2011 | Liu et al. |
| 2011/0149373 A1 | 6/2011 | Liu et al. |
| 2011/0155295 A1 | 6/2011 | Liu et al. |
| 2011/0156302 A1 | 6/2011 | Liu et al. |
| 2011/0157672 A1 | 6/2011 | Liu et al. |
| 2011/0157674 A1 | 6/2011 | Liu et al. |
| 2011/0159604 A1 | 6/2011 | Liu et al. |
| 2011/0160095 A1 | 6/2011 | Liu et al. |
| 2011/0171419 A1 | 7/2011 | Liu et al. |
| 2011/0171559 A1 | 7/2011 | Jiang et al. |
| 2011/0180968 A1 | 7/2011 | Liu et al. |
| 2011/0181171 A1 | 7/2011 | Liu et al. |
| 2011/0194845 A1 | 8/2011 | Jiang et al. |
| 2011/0194846 A1 | 8/2011 | Jiang et al. |

FOREIGN PATENT DOCUMENTS

CN  101239712  8/2008

* cited by examiner

CARBON NANOTUBE STRUCTURE

CROSS-REFERENCE TO RELATED APPLICATION

This application claims all benefits accruing under 35 U.S.C. §119 from China Patent Application No. 201010122030.0, filed on Jun. 29, 2010, in the China Intellectual Property Office, the disclosure of which is incorporated herein by reference. This application is related to a commonly-assigned application entitled, "METHOD FOR MAKING CARBON NANOTUBE STRUCTURE", U.S. patent application Ser. No. 12/960,643, filed Dec. 6, 2010.

BACKGROUND

1. Technical Field

The present disclosure relates to a carbon nanotube structure.

2. Description of Related Art

Carbon nanotubes are tubules of carbon generally having a diameter of about 0.5 nanometers to about 100 nanometers, and composed of a number of coaxial cylinders of graphite sheets. Generally, the carbon nanotubes prepared by conventional methods are in particle or powder forms. The particle or powder-shaped carbon nanotubes limit the applications in which they can be used. Thus, preparation of macro-scale carbon nanotube structures, such as carbon nanotube precursor wires, has attracted attention.

A carbon nanotube wire having a macro-scale carbon nanotube structure is directly drawn from a carbon nanotube array on a substrate. The carbon nanotube wire includes a plurality of successive carbon nanotubes substantially oriented along a same direction. The carbon nanotubes joined end to end by van der Waals attractive force therebetween.

However, the carbon nanotubes are only joined by the van der Waals attractive force therebetween, thus, a mechanical strength of the carbon nanotube wire needs to be improved.

What is needed, therefore, is to provide a carbon nanotube structure, to overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
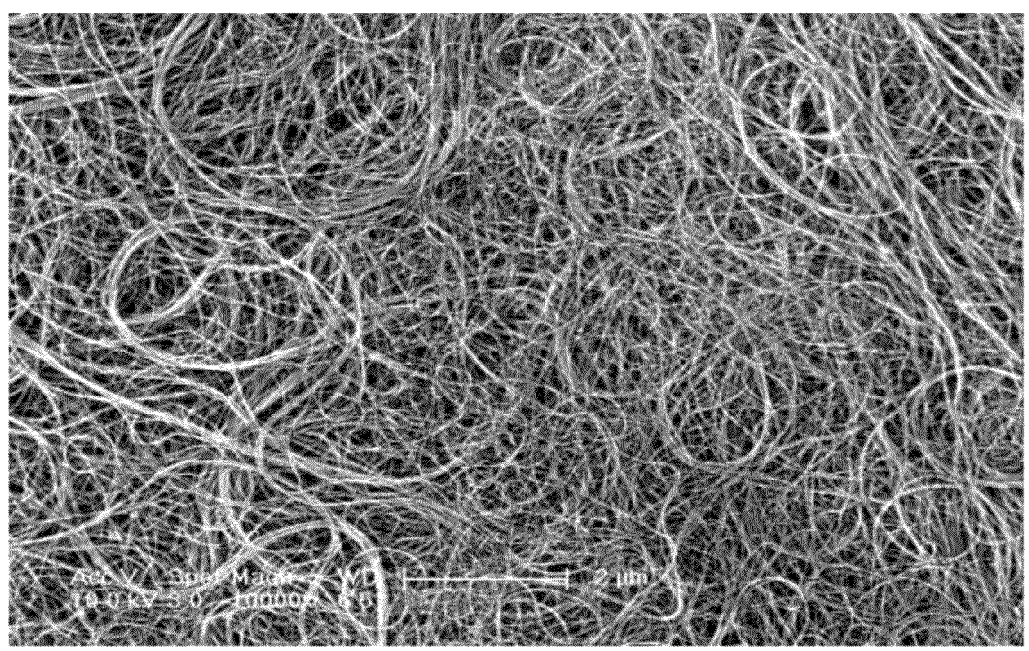
FIG. 1 shows a Scanning Electron Microscope (SEM) image of a flocculated carbon nanotube precursor film.

The disclosure is illustrated by way of example and not by way of limitation in the figures of the accompanying drawings. It should be noted that references to "an" or "one" embodiment in this disclosure are not necessarily to the same embodiment, and such references mean at least one.

A method for making a carbon nanotube structure of one embodiment can include the following steps:

S10, providing a carbon nanotube precursor comprising a plurality of carbon nanotubes joined by van der Waals attractive force therebetween; S20, placing the carbon nanotube precursor in a chamber with low oxygen environment; and S30, heating the carbon nanotube precursor in the chamber to form a plurality of carbon-carbon bonds between the carbon nanotubes.

In step S10, the carbon nanotube precursor can be a planar structure, a linear structure, or other tridimensional structures. The carbon nanotubes distributed in the carbon nanotube precursor can define a plurality of micropores therein. The carbon nanotubes of the carbon nanotube precursor can form on a heat resistant substrate by means of deposition or sputtering, providing an average size of the micropores in a range from about 0.2 nanometers to about 9 nanometers. In one embodiment, the average size of the micropores is in a range from about 0.2 nanometers to about 1 nanometer. The carbon nanotube precursor can form a free-standing structure. The term "free-standing structure" can be defined as a structure that does not have to be supported by a substrate. For example, a free-standing structure can sustain the weight of itself if the free-standing structure is hoisted by a portion thereof without any significant damage to its structural integrity. An average size of the micropores can be in a range from about 0.2 nanometers to about 9 nanometers. The carbon nanotubes can have a significant van der Waals attractive force therebetween. The free-standing structure of the carbon nanotube precursor is realized by the carbon nanotubes joined by van der Waals attractive force. So, if the carbon nanotube precursor is placed between two separate supporters, a portion of the carbon nanotube precursor not in contact with the two supporters would be suspended between the two supporters and yet maintain film structural integrity.

The carbon nanotube precursor can includes a carbon nanotube precursor film. The carbon nanotubes in the carbon nanotube precursor film can be orderly or disorderly arranged. If the carbon nanotube precursor includes a plurality of carbon nanotube precursor film stacked together, adjacent carbon nanotube precursor films can only be adhered by van der Waals attractive force therebetween.

The term 'disordered carbon nanotube precursor film' includes, but is not limited to, a structure where the carbon nanotubes are arranged along many different directions such that the number of carbon nanotubes arranged along each different direction can be almost the same (e.g. uniformly disordered), and/or entangled with each other. 'Ordered carbon nanotube precursor film' includes, but is not limited to, a structure where the carbon nanotubes are arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube precursor film can be single-walled, double-walled, and/or multi-walled carbon nanotubes.

Macroscopically, the carbon nanotube precursor film may have a substantially planar structure. The planar carbon nanotube precursor can have a thickness of about 0.5 nanometers to about 100 microns. The carbon nanotube precursor film can include at least one carbon nanotube precursor film, the at least one carbon nanotube precursor film including a plurality of carbon nanotubes substantially parallel to a surface of the corresponding carbon nanotube precursor film.

The carbon nanotube precursor film can include a flocculated carbon nanotube precursor film as shown in FIG. 1. The flocculated carbon nanotube precursor film can include a plurality of long, curved, disordered carbon nanotubes entangled with each other and can form a free-standing structure. Further, the flocculated carbon nanotube precursor film can be isotropic. The carbon nanotubes can be substantially uniformly dispersed in the carbon nanotube precursor film. The adjacent carbon nanotubes are acted upon by the van der Waals attractive force therebetween. Further, due to the carbon nanotubes in the carbon nanotube precursor being entangled with each other, the carbon nanotube precursor employing the flocculated carbon nanotube precursor film has excellent durability and can be fashioned into desired shapes with a low risk to the integrity of carbon nanotube precursor. The flocculated carbon nanotube precursor film, in some embodiments, will not require the use of structural support due to the carbon nanotubes being entangled and adhered together by van der Waals attractive force therebetween.

Figure 2:
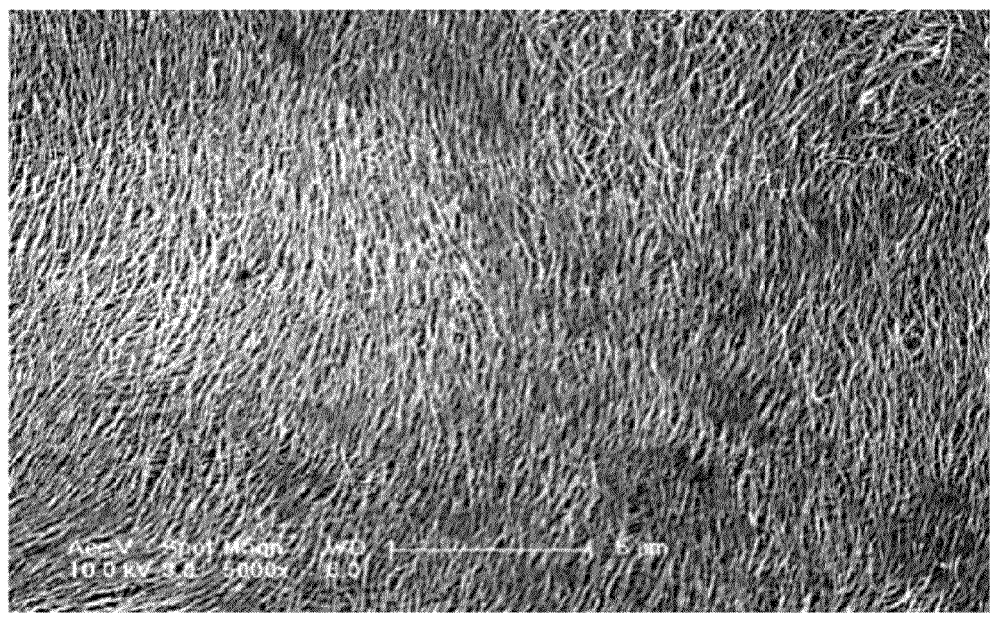
FIG. 2 shows an SEM image of a pressed carbon nanotube precursor film.

The carbon nanotube precursor film can include a pressed carbon nanotube precursor film. The carbon nanotubes in the pressed carbon nanotube precursor film can be arranged along a substantially same direction or arranged along different directions. The carbon nanotubes in the pressed carbon nanotube precursor film can rest upon each other. The adjacent carbon nanotubes are combined and attracted to each other by van der Waals attractive force, and can form a free-standing structure. An angle between a primary alignment direction of the carbon nanotubes and a surface of the pressed carbon nanotube precursor film can be in an approximate range from 0 degrees to approximately 15 degrees. The pressed carbon nanotube precursor film can be formed by pressing a carbon nanotube array. The angle is closely related to pressure applied to the carbon nanotube array. The greater the pressure, the smaller the angle. The carbon nanotubes in the carbon nanotube precursor film can be substantially parallel to the surface of the carbon nanotube precursor film if the angle is about 0 degrees. A length and a width of the carbon nanotube precursor film can be set as desired. The pressed carbon nanotube precursor film can include a plurality of carbon nanotubes substantially aligned along one or more directions. The pressed carbon nanotube precursor film can be obtained by pressing the carbon nanotube array with a pressure head. Alternatively, the shape of the pressure head and the pressing direction can determine the direction of the carbon nanotubes arranged therein. Specifically, in one embodiment, a planar pressure head is used to press the carbon nanotube array along the direction perpendicular to a substrate. A plurality of carbon nanotubes pressed by the planar pressure head may be sloped in many directions. In another embodiment, as shown in FIG. 2, if a roller-shaped pressure head is used to press the carbon nanotube array along a certain direction, the pressed carbon nanotube precursor film having a plurality of carbon nanotubes substantially aligned along the certain direction can be obtained. In another embodiment, if the roller-shaped pressure head is used to press the carbon nanotube array along different directions, the pressed carbon nanotube precursor film having a plurality of carbon nanotubes substantially aligned along different directions can be obtained.

Figure 3:
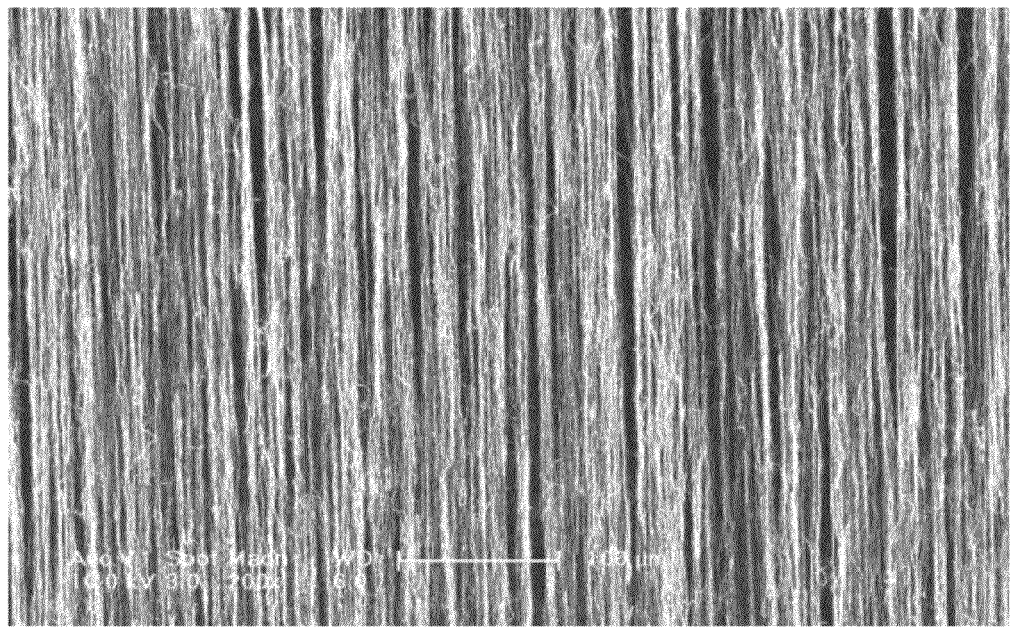
FIG. 3 shows an SEM image of a drawn carbon nanotube precursor film.

In some embodiments, the carbon nanotube precursor film includes at least one drawn carbon nanotube precursor film as shown in FIG. 3. The drawn carbon nanotube precursor film can have a thickness of about 0.5 nanometers to about 100 microns. The drawn carbon nanotube precursor film includes a plurality of carbon nanotubes that can be arranged substantially parallel to a surface of the drawn carbon nanotube precursor film. A large number of the carbon nanotubes in the drawn carbon nanotube precursor film can be oriented along a preferred orientation, meaning that a large number of the carbon nanotubes in the drawn carbon nanotube precursor film are arranged substantially along the same direction. An end of one carbon nanotube is joined to another end of an adjacent carbon nanotube arranged substantially along the same direction by van der Waals attractive force. More specifically, the drawn carbon nanotube precursor film includes a plurality of successively oriented carbon nanotube segments joined end-to-end by van der Waals attractive force therebetween. Each carbon nanotube segment includes a plurality of carbon nanotubes substantially parallel to each other and joined by van der Waals attractive force therebetween. The carbon nanotube segments can vary in width, thickness, uniformity, and shape. A small number of the carbon nanotubes are randomly arranged in the drawn carbon nanotube precursor film, and has a small if not negligible effect on the larger number of the carbon nanotubes in the drawn carbon nanotube precursor film arranged substantially along the same direction.

Understandably, some variation can occur in the orientation of the carbon nanotubes in the drawn carbon nanotube precursor film as can be seen in FIG. 3. Microscopically, the carbon nanotubes oriented substantially along the same direction may not be perfectly aligned in a straight line, and some curve portions may exist.

Furthermore, it can be understood that some carbon nanotubes are located substantially side by side and oriented along the same direction and in contact with each other.

Figure 4:
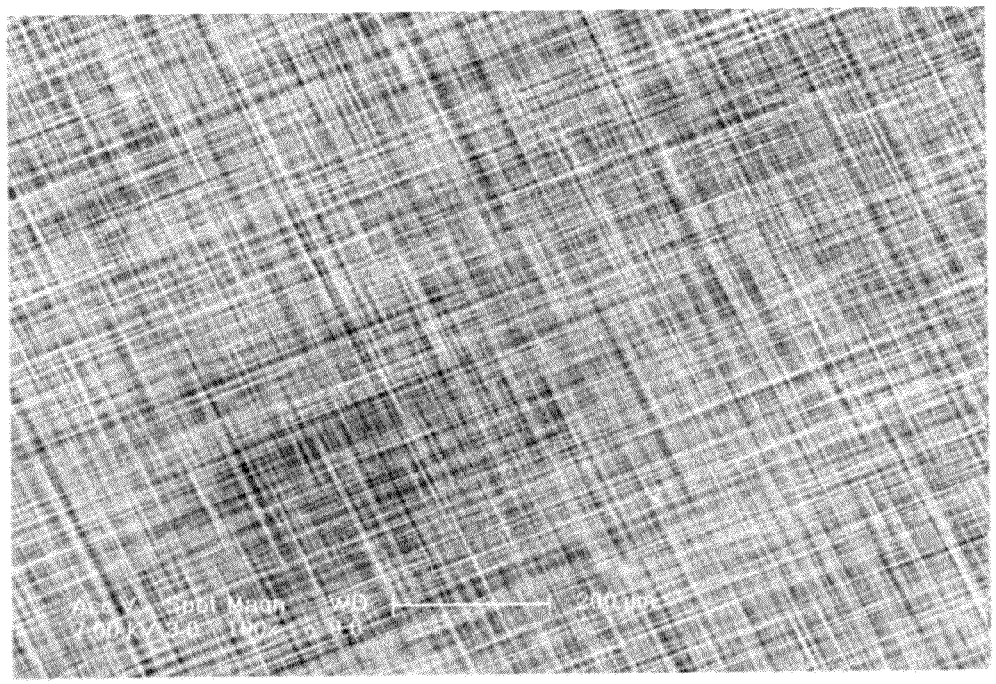
FIG. 4 shows an SEM image of a carbon nanotube structure consisting of a plurality of stacked drawn carbon nanotube precursor films.

The carbon nanotube precursor film can include a plurality of stacked drawn carbon nanotube precursor films. Adjacent drawn carbon nanotube precursor films can be adhered by only the van der Waals attractive force therebetween. An angle can exist between the carbon nanotubes in adjacent drawn carbon nanotube precursor films. The angle between the aligned directions of the adjacent drawn carbon nanotube precursor films can range from 0 degrees to about 90 degrees. In one embodiment, the angle between the aligned directions of the adjacent drawn carbon nanotube precursor films is substantially 90 degrees as shown in FIG. 4. Simultaneously, aligned directions of adjacent drawn carbon nanotube precursor films can be substantially perpendicular to each other.

The carbon nanotube precursor can include a carbon nanotube precursor wire. The carbon nanotube precursor wire structure can include a plurality of carbon nanotubes joined end to end by van der Waals attractive force therebetween along an axial direction. The carbon nanotube precursor can include a plurality of carbon nanotube precursor wires. A plurality of intertube spaces can be defined among the carbon nanotube precursor wires. The carbon nanotube precursor wires can be substantially parallel to each other to form a bundle-like structure or twisted with each other to form a twisted structure. The plurality of carbon nanotube precursor wires can also be woven together to form a woven structure.

The bundle-like structure, the twisted structure, and the woven structure are three kinds of linear shaped carbon nanotube precursor.

Figure 5:
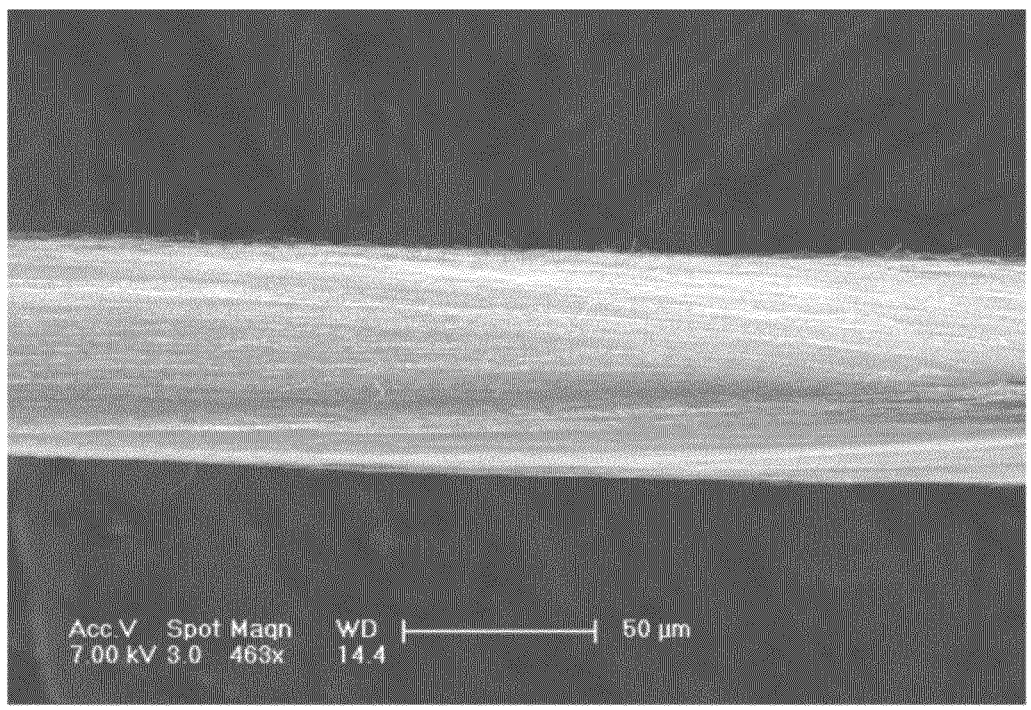
FIG. 5 shows an SEM image of an untwisted carbon nanotube precursor wire.

The carbon nanotube precursor wire can be untwisted or twisted. Treating the drawn carbon nanotube precursor film with a volatile solvent can obtain the untwisted carbon nanotube precursor wire. In one embodiment, the volatile solvent can be applied to soak the entire surface of the drawn carbon nanotube precursor film. During the soaking, adjacent substantially parallel carbon nanotubes in the drawn carbon nanotube precursor film will bundle together due to the surface tension of the volatile solvent as it volatilizes, and thus the drawn carbon nanotube precursor film will be shrunk into an untwisted carbon nanotube precursor wire. The untwisted carbon nanotube precursor wire includes a plurality of carbon nanotubes substantially oriented along a same direction (i.e., a direction along the length direction of the untwisted carbon nanotube precursor wire) as shown in FIG. 5. The carbon nanotubes are substantially parallel to the axis of the untwisted carbon nanotube precursor wire. In one embodiment, the untwisted carbon nanotube precursor wire includes a plurality of successive carbon nanotubes joined end to end by van der Waals attractive force therebetween. The length of the untwisted carbon nanotube precursor wire can be arbitrarily set as desired. A diameter of the untwisted carbon nanotube precursor wire ranges from about 0.5 nanometers to about 100 micrometers.

Figure 6:
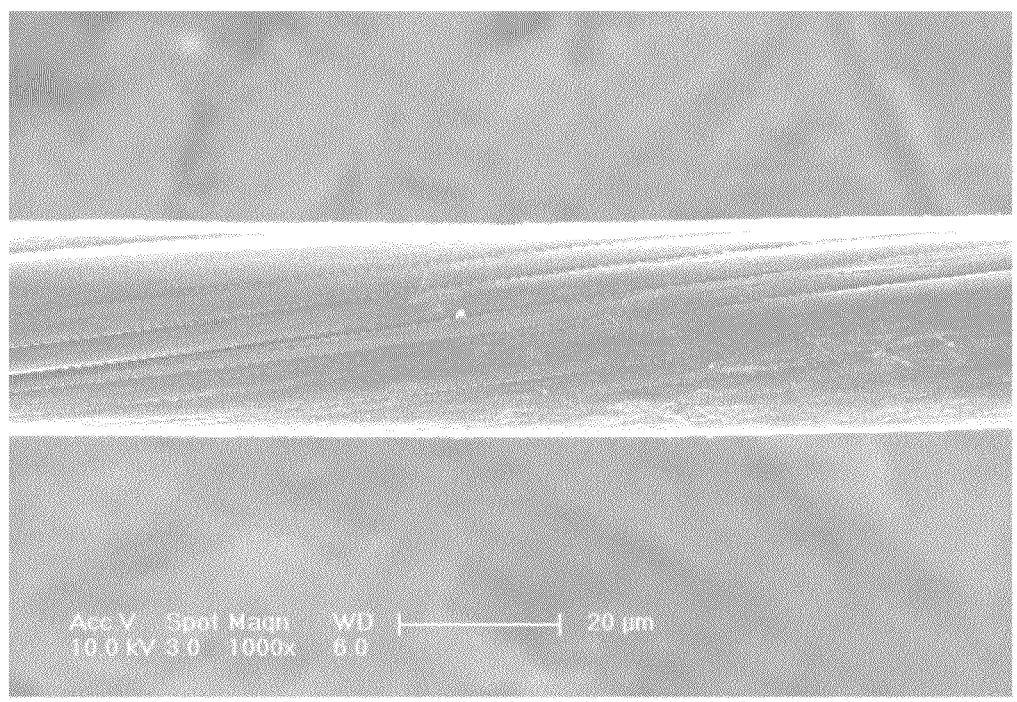
FIG. 6 shows an SEM image of a twisted carbon nanotube precursor wire defined as a CNT precursor wire.

The twisted carbon nanotube precursor wire can be obtained by twisting a drawn carbon nanotube precursor film using a mechanical force to turn the two ends of the drawn carbon nanotube precursor film in opposite directions. The twisted carbon nanotube precursor wire includes a plurality of carbon nanotubes helically oriented around an axial direction of the twisted carbon nanotube precursor wire as shown in FIG. 6. In one embodiment, the twisted carbon nanotube precursor wire includes a plurality of successive carbon nanotubes joined end to end by van der Waals attractive force therebetween. The length of the carbon nanotube precursor wire can be set as desired. A diameter of the twisted carbon nanotube precursor wire can be from about 0.5 nanometers to about 100 micrometers.

In step S20, a structure of the chamber is not limited, provided the low oxygen environment can be present in the chamber. The term "low oxygen environment" can be defined as an environment with deficient oxygen or nearly without oxygen. For example, a partial gas pressure of the oxygen in the chamber can be less than or equal to $1*10^{-2}$ Pa, to maintain the low oxygen environment. In one embodiment, the partial gas pressure of the oxygen in the chamber is less than or equal to $1*10^{-5}$ Pa. Due to the low oxygen level environment defined in the chamber, there is nearly no oxygen, which can contact with the carbon nanotube precursor placed in the chamber. Thus, if the carbon nanotube precursor is heated in the chamber, nearly no carbon nanotubes will be oxidized. To obtain the low oxygen environment in the chamber, the chamber can be filled with inert gas or less air. If the chamber is filled with air, the chamber can have a gas pressure less than or equal to $5*10^{-2}$ Pa. In one embodiment, the gas pressure in the chamber filled with air is less than or equal to $5*10^{-5}$ Pa.

In step S30, the carbon nanotube precursor can be heated to a restructuring temperature greater than or equal to 1500 degrees to obtain the carbon-carbon bonds between the carbon nanotubes. In one embodiment, the restructuring temperature is greater than or equal to 2000 degrees to obtain more carbon-carbon bonds. Means for heating the carbon nanotube precursor is not limited. The carbon nanotube precursor can be heated by directly heating the chamber or can be heated by irradiating the carbon nanotubes of the carbon nanotube precursor by a laser. If the carbon nanotube precursor is heated by a laser, the laser can have an irradiating power of about 10 W to about 30 W. A sweep-frequency of the laser can be in a range from about 5 millimeters per second to about 300 millimeters per second.

Generally, the carbon nanotubes of the carbon nanotube precursor can not only include a number of hexatomic rings consisting of six atoms, but also include a few five-membered rings consisting of six atoms and a few seven-membered rings. For example, if the carbon nanotubes are produced by the metal-organic chemical vapor deposition technology, a number of five-membered rings and a number of seven-membered rings can be present at ends of the carbon nanotubes. The five-membered rings and the seven-membered rings are defects generated by growing the carbon nanotubes, which can decrease a mechanical strength of the carbon nanotubes. A structure of the hexatomic ring can be steadier than that of the five-membered rings or the seven-membered rings. When the carbon nanotube precursor is heated to the heating temperature, lattices of the five-membered rings and the seven-membered rings can be restructured into hexatomic rings having a steady structure. Thus, the mechanical strength of the carbon nanotubes can be improved.

Further, the lattices of the five-membered rings and the seven-membered rings of adjacent carbon nanotubes can also be restructured, thus the carbon-carbon bonds can be formed between any two adjacent carbon nanotubes and join adjacent carbon nanotubes. An average gap between the adjacent carbon nanotubes can be in a range from about 0.2 nanometers to about 9 nanometers. In one embodiment, the average gap is in a range from about 0.2 nanometers to about 1 nanometer, and substantially equal to an average of lengths of the carbon-carbon bonds (about 0.14 nanometers). The shorter the average gap between the adjacent carbon nanotubes, the more the carbon-carbon bonds can be formed between the adjacent carbon nanotubes.

The adjacent carbon nanotubes can include a first carbon nanotube and a second carbon nanotube adjacent to the first carbon nanotube. When the first carbon nanotube and the second carbon nanotube are heated, some five-membered rings of the first carbon nanotube and some seven-membered rings of the second carbon nanotube would be opened and restructured into the hexatomic rings between the first carbon nanotube and the second carbon nanotube. Therefore, a number of carbon-carbon bonds can be joined between the carbon nanotubes. Due to the carbon-carbon bonds or hexatomic rings joined between the carbon nanotubes, a binding force of the adjacent carbon nanotubes can be improved, a binding force of the carbon nanotube structure can be improved. If the first carbon nanotube and the second carbon nanotube are joined end-to-end, a first end of the first carbon nanotube and a second end of the second carbon nanotube are joined together, and the carbon nanotubes can be joined end to end by carbon-carbon bonds or hexatomic rings therebetween. Simultaneously, the carbon nanotubes of the carbon nanotube precursor can only be joined by van der Waals attractive force therebetween, and the carbon-carbon bonds and the van der Waals attractive force can join carbon nanotubes of the carbon nanotube structure. Thus, the mechanical strength of the carbon nanotube structure can be greater than that of the carbon nanotube precursor.

If the carbon chamber is filled with air and the carbon nanotube precursor received in the chamber is the drawn carbon nanotube precursor film, a method for making a carbon nanotube structure, of one embodiment can include the following steps:

S110, providing a carbon nanotube array on a substrate;

S120, placing the carbon nanotube array and the substrate in the chamber, wherein the gas pressure of the chamber is less than or equal to $5*10^{-2}$ Pa;

S130, pulling the drawn carbon nanotube precursor film out from the carbon nanotube array; and S140, heating the carbon nanotube precursor in the chamber to form the carbon nanotube structure.

In step S110, the carbon nanotube array can be a super-aligned array of the carbon nanotubes. However, any carbon nanotube array from which a film can be drawn may be used. The super-aligned array of carbon nanotubes can be formed by the steps of:

S101, providing a substantially flat and smooth substrate;

S102, forming a catalyst layer on the substrate;

S103, annealing the substrate with the catalyst layer thereon in air at a temperature in an approximate range from 300° C. to 900° C. (such as 700° C.) for about 30 to about 90 minutes;

S104, heating the substrate with the catalyst layer thereon at a temperature in an approximate range from 500° C. to 900° C. (such as 740° C.) in a furnace with a protective gas therein; and S105, supplying a carbon source gas to the furnace for about 5 to about 30 minutes and growing a super-aligned array of carbon nanotubes on the substrate.

In step S101, the substrate can be a P-type silicon wafer, an N-type silicon wafer, or a silicon wafer with a film of silicon dioxide thereon. Simultaneously, a 4 inch P-type silicon wafer can be used as the substrate. In step S102, the catalyst can be made of iron (Fe), cobalt (Co), nickel (Ni), or combinations thereof.

In step S104, the protective gas can be made up of at least one of nitrogen ($N_2$), ammonia ($NH_3$), and a noble gas. In step S105, the carbon source gas can be a hydrocarbon gas, such as ethylene ($C_2H_4$), methane ($CH_4$), acetylene ($C_2H_2$), ethane ($C_2H_6$), or combinations thereof.

The super-aligned array of the carbon nanotubes can opportunely have a height of about 2 microns to 10 millimeters. The carbon nanotubes are substantially parallel to each other and substantially perpendicular to the substrate. In one embodiment, the carbon nanotubes have a height of about 100 microns to about 900 microns. The super-aligned array of carbon nanotubes formed under the above conditions is essentially free of impurities, such as carbonaceous or residual catalyst particles. The carbon nanotubes in the super-aligned array are closely packed together by the van der Waals attractive force.

In step S120, the chamber can be vacuumized to have a gas pressure less than or equal to $5*10^{-2}$ Pa. Gas filled in the chamber can be atmospheric air. In one embodiment, the gas pressure of the chamber is less than or equal to $5*10^{-5}$ Pa.

In step S130, the drawn carbon nanotube precursor film can be drawn out from the carbon nanotube array by the steps of: S131, contacting the carbon nanotube array with an adhesive bar; and S132, moving the adhesive bar away from the carbon nanotube array.

In step S131, the adhesive bar can include a body with a side surface covered by an adhesive layer. The side surface of the body can be made of a material that has a great attractive force to the carbon nanotubes. Therefore, the side surface of the body can be used as a contacting surface to contact a plurality of carbon nanotubes of the carbon nanotube array, and the carbon nanotubes can be firmly adhered to the side surface of the adhesive bar. The adhesive bar can be fixed to a stretching device via a fixing device. The fixing device can be a generally U-shaped clamp with an adjustable opening facing the carbon nanotube array.

In step S132, if the adhesive bar is driven to move away from the carbon nanotube array, a plurality of carbon nanotube segments can be pulled out from the carbon nanotube array end-to-end to form the drawn carbon nanotube precursor film due to the van der Waals attractive force between adjacent carbon nanotube segments. During the pulling process, an angle between a direction of pulling the drawn carbon nanotube precursor film and the longitudinal direction of the carbon nanotube array can be in a range of about 30 degrees to about 90 degrees. In one embodiment, the angle between the direction of pulling the drawn carbon nanotube precursor film and the longitudinal direction of the carbon nanotube array is about 85 degrees. An angle of about 85 degrees has been found to improve a uniformity of the drawn carbon nanotube precursor film. The longitudinal direction is substantially parallel to the central axis of most of carbon nanotubes. The longitudinal direction of the carbon nanotube array is substantially perpendicular to a top surface of the substrate.

As the drawn carbon nanotube precursor film is continuously pulled out, gas turbulence surrounding the carbon nanotube array and the drawn carbon nanotube precursor film can occur and adversely impact the drawn carbon nanotube precursor film. The lower the gas pressure of the chamber, the lower the density of the gas filled in the chamber, and the lower the probability of the turbulences of the gas. Thus, if a speed of pulling the drawn carbon nanotube precursor film remains constant, the number of defects of drawn carbon nanotube precursor film can be decreased by decreasing the density of the gas filled in the chamber. The density of the gas filled in the chamber is less than a density of air having a gas pressure greater than or equal to $5*10^{-2}$ Pa. Thus, fewer defects will occur in the drawn carbon nanotube precursor film formed in the chamber than in the room having a gas pressure greater than or equal to $5*10^{-2}$ Pa. Thus, uniformity of the drawn carbon nanotube precursor film can be improved with the decrease of the gas pressure of the chamber.

A carbon nanotube structure of one embodiment includes a plurality of carbon nanotubes and a plurality of carbon-carbon bonds between the carbon nanotubes. The carbon nanotube structure can be fabricated by the methods mentioned above.

The carbon nanotubes of the carbon nanotube structure can be joined by the carbon-carbon bonds or van der Waals attractive force therebetween. The carbon-carbon bonds can be connected on sidewalls of the carbon nanotubes or be connected on ends of the carbon nanotubes. In one embodiment, most of the carbon-carbon bonds are connected to the ends of the carbon nanotubes.

The carbon nanotube structure can include a carbon nanotube film. The carbon nanotubes of the carbon nanotube film can be substantially parallel to a surface of the corresponding carbon nanotube film. The carbon nanotube structure can include a number of carbon nanotube films stacked together. Adjacent carbon nanotube films can be combined by the carbon-carbon bonds and van der Waals attractive force therebetween.

The carbon nanotubes of the carbon nanotube film can be entangled with each other to form a free-standing structure. The carbon nanotube film can be isotropic. The carbon nanotubes can be substantially uniformly dispersed in the carbon nanotube film. The adjacent carbon nanotubes can be acted upon by the van der Waals attractive force and the carbon-carbon bonds therebetween. The carbon nanotube film can be fabricated by heating the flocculated carbon nanotube precursor film in the chamber mentioned above.

The carbon nanotubes of the carbon nanotube film can be arranged along a same direction or arranged along different directions. The carbon nanotubes in the carbon nanotube film can rest upon each other. The adjacent carbon nanotubes are combined and attracted to each other by van der Waals attractive force and the carbon-carbon bonds, and can form a free-standing structure. An angle between a primary alignment direction of the carbon nanotubes and a surface of the carbon nanotube precursor film can be in an approximate range from 0 degrees to approximately 15 degrees. The carbon nanotube film can be fabricated by heating the pressed carbon nanotube precursor film in the chamber mentioned above.

The carbon nanotubes of the carbon nanotube film can be arranged substantially parallel to a surface of the carbon nanotube film. A large number of the carbon nanotubes in the carbon nanotube film can be oriented along a preferred orientation, meaning that a large number of the carbon nanotubes in the carbon nanotube film are arranged substantially along the same direction. An end of one carbon nanotube is joined to another end of an adjacent carbon nanotube arranged substantially along the same direction by van der Waals attractive force and the carbon-carbon bonds. More specifically, the carbon nanotube film includes a plurality of successively oriented carbon nanotube segments joined end-to-end by van der Waals attractive force therebetween and the carbon-carbon bonds. Each carbon nanotube segment includes a plurality of carbon nanotubes substantially parallel to each other and joined by van der Waals attractive force therebetween. The carbon nanotube segments can vary in width, thickness, uniformity, and shape. A small number of the carbon nanotubes are randomly arranged in the carbon nanotube film and has a small if not negligible effect on the larger number of the carbon nanotubes in the carbon nanotube film arranged substantially along the same direction. The carbon nanotube film can be fabricated by heating the drawn carbon nanotube precursor film in the chamber mentioned above.

The carbon nanotube structure can include a carbon nanotube wire. The carbon nanotube wire can include a plurality of carbon nanotubes joined end to end along an axial direction by van der Waals attractive force and carbon-carbon bonds therebetween. The carbon nanotube structure can include a number of carbon nanotube wires. The carbon nanotube wires can be substantially parallel to each other to form a bundle-like structure or twisted with each other to form a twisted structure. The carbon nanotube wires can also be woven together to form a woven structure. The bundle-like structure, the twisted structure, and the woven structure are three kinds of linear shaped carbon nanotube structure. The carbon nanotube wire can be fabricated by heating the carbon nanotube precursor wire in the chamber mentioned above.

Figure 7:
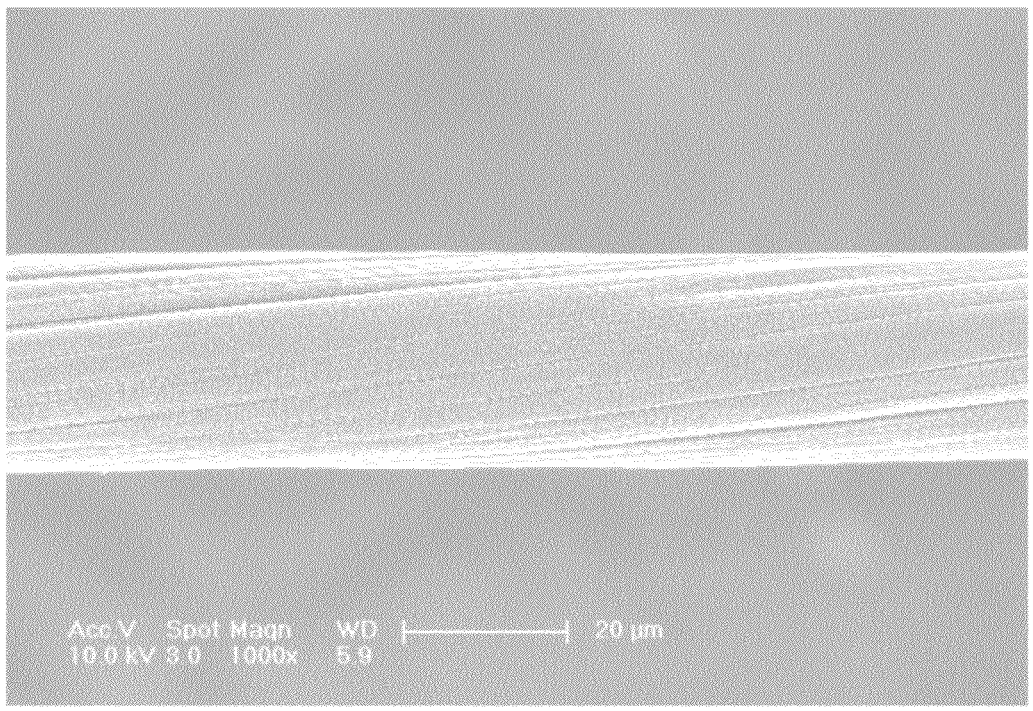
FIG. 7 shows an SEM image of a twisted carbon nanotube wire defined as CNT wire.

To study and compare properties of the carbon nanotube structure and the carbon nanotube precursor, a twisted carbon precursor wire as shown in FIG. 6 is provided and defined as a CNT precursor wire. The twisted carbon precursor wire includes a plurality of carbon nanotubes joined end to end by van der Waals attractive force. The CNT precursor wire can be placed in a chamber having a gas pressure less than or equal to $5*10^{-5}$ Pa. The CNT precursor wire received in the chamber can be irradiated by a laser having an irradiating power of 30 W and having a sweep-frequency of about 50 millimeters per second. When the laser irradiates the CNT precursor wire, lattices of carbon atoms of the carbon nanotubes can be restructured to form a plurality of carbon-carbon bonds, thus a twisted carbon nanotube wire can be obtained as shown in FIG. 7. The twisted carbon nanotube wire can be named as a CNT wire.

Figure 8:
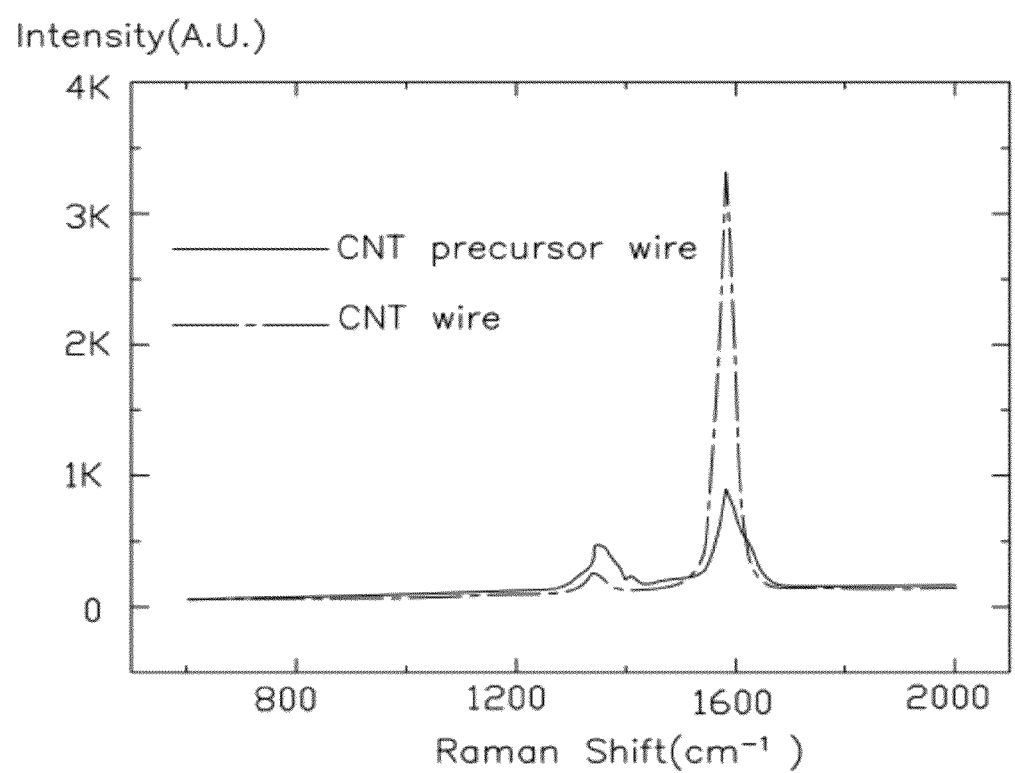
FIG. 8 shows a comparison of the Raman spectra of the CNT wire and the CNT precursor wire.

To study and compare Raman spectras of the CNT precursor wire and the CNT wire, two main Raman peaks of carbon nanotubes can be measured, i.e., D peak (about $1350\ cm^{-1}$) and G peak (about $1580\ cm^{-1}$) as shown in FIG. 8. G peak is a scattering peak, and D peak is a defecting peak. An intensity of the G peak for the CNT wire is greater than an intensity of the G peak of the CNT precursor wire, and an intensity of the D peak for the CNT wire is less than an intensity of the D peak of the CNT precursor wire, thus, defects in the CNT wire is less than defects in the CNT precursor wire.

Figure 9:
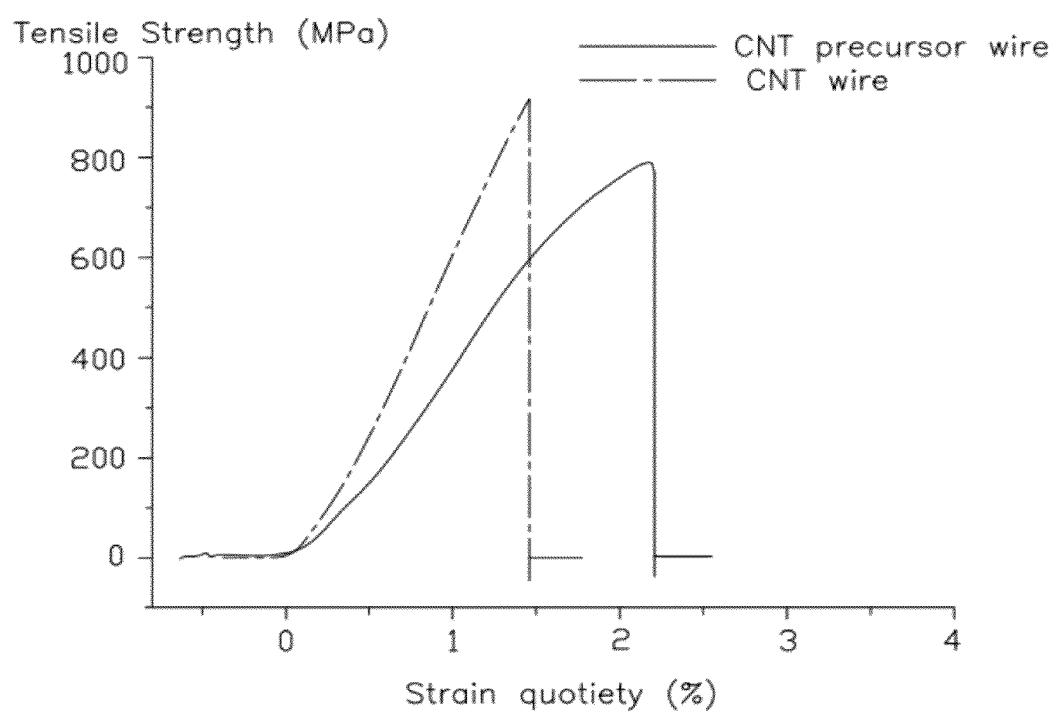
FIG. 9 shows a comparison of the tensile strengths of the CNT wire and the CNT precursor wire, if the two wires have a determined strain.

Referring to FIG. 9, tensile strengths of the CNT wire and the CNT precursor wire can be recorded if the two wires have a determined strain along axial directions thereof. As can be seen, the tensile strength of the CNT wire can be greater than 800 Mpa and less than 930 Mpa, and the tensile strength of the CNT precursor wire is less than or equal to 800 Mpa. Due to a number of carbon-carbon bonds joined between the carbon nanotubes of the CNT wire, the tensile strength of the composite CNT wire can be greater than the tensile strength of the CNT precursor wire, and a mechanical strength of the CNT wire can be greater than a mechanical strength of the CNT precursor wire.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order of the steps.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A carbon nanotube structure comprising a plurality of carbon nanotubes and a plurality of carbon-carbon bonds joined between the carbon nanotubes, wherein the carbon nanotube structure comprises a carbon nanotube wire has a tensile strength greater than 800 Mpa and less than 930 Mpa.

2. The carbon nanotube structure of claim 1, wherein the carbon nanotubes are joined by the carbon-carbon bonds and van der Waals attractive force.

3. The carbon nanotube structure of claim 1, wherein the carbon-carbon bonds between the carbon nanotubes define a plurality of hexatomic rings.

4. The carbon nanotube structure of claim 1, wherein the carbon nanotube structure comprises a carbon nanotube film, or a combination thereof.

5. The carbon nanotube structure of claim 4, wherein the carbon nanotube film is isotropic, the carbon nanotubes of the carbon nanotube film are entangled with each other, and each of the carbon-carbon bonds is joined between two entangled carbon nanotubes of the carbon nanotube film.

6. The carbon nanotube structure of claim 4, wherein the carbon nanotubes of the carbon nanotube film are substantially parallel to a surface of the carbon nanotube film.

7. The carbon nanotube structure of claim 4, wherein the carbon nanotubes of the carbon nanotube film are substantially arranged along a same direction or along different directions, the carbon nanotubes rest upon each other, and each of the carbon-carbon bonds is joined between two carbon nanotubes of the carbon nanotube film resting upon each other.

8. The carbon nanotube structure of claim 4, wherein the carbon nanotubes of the carbon nanotube film are substantially arranged along a same direction, and joined end to end by the carbon-carbon bonds and van der Waals attractive force.

9. The carbon nanotube structure of claim 4, wherein the carbon nanotube structure comprises a plurality of carbon nanotube films, wherein adjacent carbon nanotube films are combined by the carbon-carbon bonds and van der Waals attractive force.

10. The carbon nanotube structure of claim 1, wherein the carbon nanotube wire comprises a plurality of carbon nanotubes joined end to end by the carbon-carbon bonds and van der Waals attractive force therebetween along an axis of the carbon nanotube wire.

11. The carbon nanotube structure of claim 10, wherein the carbon nanotubes are substantially oriented along the axis of the carbon nanotube wire.

12. The carbon nanotube structure of claim 10, wherein the carbon nanotubes are helically oriented around the axis of the carbon nanotube wire.

13. The carbon nanotube structure of claim 1, wherein the carbon nanotube structure comprises a plurality of carbon nanotube wires substantially parallel to each other, or crossed with each other, and adjacent carbon nanotube wires are combined and attracted to each other by the carbon-carbon bonds and van der Waals attractive force therebetween.

14. A carbon nanotube structure comprising a plurality of carbon nanotube wires, wherein each of the carbon nanotube wires comprises a plurality of first carbon nanotubes joined end to end by carbon-carbon bonds therebetween, wherein each of the carbon nanotube wires has a tensile strength in a range from about 800 Mpa to about 920 Mpa.

15. The carbon nanotube structure of claim 14, wherein the each of the carbon nanotube wires further comprises a plurality of second carbon nanotubes joined by van der Waals attractive force therebetween.

16. The carbon nanotube structure of claim 15, wherein the first carbon nanotubes and the second carbon nanotubes are substantially arranged and oriented along a same direction.

17. The carbon nanotube structure of claim 14, wherein the carbon nanotube structure is a free standing structure.

* * * * *